G. UTLEY.
Boat-Detaching Hooks.

No. 154,533.  Patented Aug. 25, 1874.

WITNESSES:
P. C. Dieterich
Fred Reisechu

INVENTOR
Gabriel Utley
per J. H. Alexander
ATTORNEY.

UNITED STATES PATENT OFFICE.

GABRIEL UTLEY, OF COLUMBIA, ASSIGNOR TO HIMSELF, J. L. FARE, AND JOSEPH A. KELLOGG, OF NASHVILLE, TENNESSEE.

IMPROVEMENT IN BOAT-DETACHING HOOKS.

Specification forming part of Letters Patent No. 154,533, dated August 25, 1874; application filed February 18, 1874.

*To all whom it may concern:*

Be it known that I, GABRIEL UTLEY, of Columbia, in the county of Davidson and State of Tennessee, have invented certain new and useful Improvements in Boat-Hook; and I do hereby declare that the following is a full, clear, and exact description thereof, reference being had to the accompanying drawings, and to the letters of reference marked thereon, which form a part of this specification.

The nature of my invention consists in the construction and arrangement of self-detaching boat-hook for fastening life-boats, as will be hereinafter more fully set forth.

In order to enable others skilled in the art to which my invention appertains to make and use the same, I will now proceed to describe its construction and operation, referring to the annexed drawing, in which—

Figure 1:
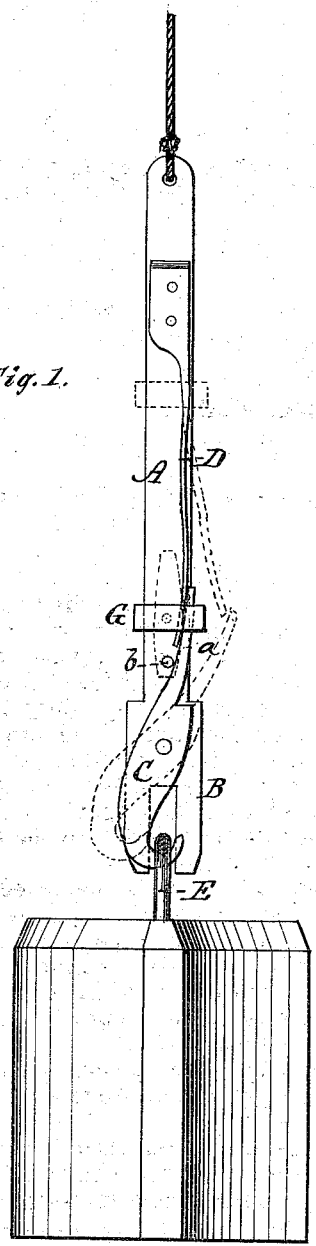
Figure 2:
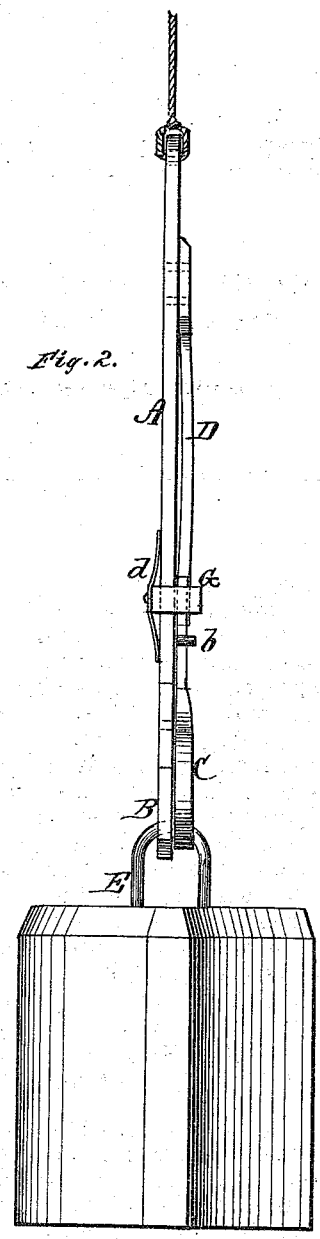

Figure 1 is a front view, and Fig. 2 is a side view, of my boat-hook.

A represents the stem of my boat-hook, the lower end of which is enlarged and slotted, forming a fork, B. A short distance above the fork, to the front side of the stem, is pivoted a hook, C, which is nearly balanced upon its pivot, the lower or hook end being only a trifle heavier than the upper end or shank *a* of the same. D represents a spring securely attached at its upper end to the front side of the stem A, and the lower end bears against the inner side of the shank *a* of the hook, so as to throw the hook part away from the fork B. *b* is a stop on the stem A, against which the shank *a* strikes when the hook C is across the fork B, so as to prevent any injury to the spring D. Around the stem A and spring D is placed a yoke, G, fitted with a spring, *d*, on the back side of the stem, which yoke slides down over the shank *a*, locking the hook in place across the fork B, so as to hold the boat-ring E by the hook in the fork.

When the life-boat is to be launched the yoke G is slid upon the stem, when the ring E is held by the hook against one side of the fork B until the boat strikes the water, when the ring E slides upward out of the hook, and the spring D throws the hook out of the ring, thus detaching the boat.

Having thus fully described my invention, what I claim as new, and desire to secure by Letters Patent, is—

The combination of the stem A, fork B, hook C, and spring D, all constructed substantially as and for the purposes herein set forth.

In testimony that I claim the foregoing as my own, I affix my signature in presence of two witnesses.

GABRIEL UTLEY.

Witnesses:
JOSIAH FERRISS,
T. F. DRAPER.